United States Patent [19]
Burton

[11] 3,710,198
[45] Jan. 9, 1973

[54] CONDUCTOR SUPPORTING PARTITION FOR ELECTRICAL CONTROL CENTER

[75] Inventor: Lawrence A. Burton, Oconomowoc, Wis.

[73] Assignee: Allen-Bradley Company, Milwaukee, Wis.

[22] Filed: Jan. 6, 1971

[21] Appl. No.: 104,327

[52] U.S. Cl..................317/120, 174/72 B, 317/117
[51] Int. Cl..............................................H02b 1/14
[58] Field of Search...................174/70 B–72 B; 317/101 CE, 117, 119, 120

[56] References Cited

UNITED STATES PATENTS

| | | | |
|---|---|---|---|
| 3,028,573 | 4/1962 | Stoehr | 317/101 CE |
| 2,019,625 | 11/1935 | O'Brien | 317/101 CE |
| 3,308,348 | 3/1967 | Olashaw | 317/119 |
| 3,588,620 | 6/1971 | Wasileski | 317/119 |

*Primary Examiner*—Lewis H. Myers
*Assistant Examiner*—Gerald P. Tolin
*Attorney*—Arthur H. Seidel and Allan W. Leiser

[57] ABSTRACT

An electrical control center is shown made up of a set of three vertical bays that are each adapted to house a number of individual control assemblies tiered one above the other. There is a separate cabinet door for each assembly, and each bay also has a vertical wiring trough along its front that is enclosed by a separate wiring trough door. In each bay there is an insulating partition that extends vertically and sidewardly in a plane spaced behind, but paralleling the front of the control center, and each partition is molded with a set of horizontal channels in its rear face and a set of vertical channels in its front face. Three power distributing buses fit snugly within the horizontal channels of the rear faces of the partitions, and extend from bay to bay to conduct electrical power throughout the control center. A set of power distributing feeder buses fit within the vertical channels of each partition, and connections are provided which secure each feeder bus with a main bus in a manner that holds the main buses, feeder buses and insulating partition of a bay in a tight assembly, with the partition sandwiched between the main and feeder buses.

15 Claims, 13 Drawing Figures

Fig.1

INVENTOR
LAWRENCE A. BURTON

BY Arthur H. Seidel

ATTORNEY

CONDUCTOR SUPPORTING PARTITION FOR ELECTRICAL CONTROL CENTER

BACKGROUND OF THE INVENTION

Electrical control centers of the type of the present invention are usually employed as enclosures for housing a number of individual motor control assemblies. Such enclosures are constructed of vertical bays attached to one another to obtain a unitary whole, and by varying the number of bays the size of a control center can be tailored to meet the requirements of a particular installation. Control centers provide the convenience of housing the electrical control equipment for a group of motors of a manufacturing or processing installation within a single location. While the term "control center" is usually associated with motor control equipment, other types of control apparatus can be housed within a control center of the present invention, such as that for governing welders, ovens or other electrical apparatus.

In the design of a control center, provision must be made for the distribution of electrical power throughout the center. Heretofore, this has normally been accomplished by running a set of horizontal buses through the top of the center, and then for each bay dropping vertical feeder buses from the horizontal buses down through nearly the entire height of the bay. The vertical feeder buses are set well back from the front of the control center, so that there is adequate space to insert cabinets containing individual assemblies of control equipment into the center. Examples of this type of construction appear in numerous U.S. Pats., some of which are Nos. 2,319,415; 2,359,247; 2,645,743; 2,997,629; 3,041,506; 3,278,698 and 3,321,672. In some of the earlier patents, such as Nos. 2,319,415 and 2,645,743, power was fed from the vertical feeder buses to the individual control equipment cabinets by the use of conductor straps that were fastened in place by nut and bolt connections. This resulted in a system of semi-permanent wiring for the power input, and later stab-type connections were introduced for electrically connecting each control assembly to the vertical feeder buses, as is illustrated in U.S. Pat. Nos. 2,997,629; 3,096,131, 3,219,887 and 3,469,149. In these latter constructions, insertion of an individual cabinet into a bay of the control center caused an automatic electrical connection to be made for the incoming power. Such type of connection has remained desirable, and the present invention provides for use of the stab-type connection for tapping power from the distribution buses.

There have been a variety of constructions for supporting the power distributing main and feeder buses of control centers. Earlier constructions supported the horizontal and vertical buses by insulating brackets at points spaced along their lengths, and this left both the horizontal and vertical buses exposed. In some later control centers the power distributing buses have been enclosed in sheaths of insulating material, to enhance protection against arcing and short circuits, and also to minimize exposure to high voltages. Examples of such constructions appear in U.S. Pat. Nos. 3,469,149; 3,096,131; 3,219,887; 3,346,776 and 3,170,091. These patents, however, do not show any special insulating treatment for the horizontal buses, which appear to be strung through the upper regions of the control center bays.

The present invention pertains primarily to the location, form of mounting, and sheathing of both horizontal and vertical power distributing buses within a control center, and a principal purpose is to provide an improved construction for the assembly of the elements that distribute incoming power.

SUMMARY OF THE INVENTION

The subject matter of the present invention resides in that part of a control center that distributes power to control circuit assemblies, and in the manner of supporting power distributing buses, and more specifically it resides in an insulating partition, that functions as a dividing wall, with channels on its front and rear faces that receive vertical and horizontal buses, all of which are united into a rigid assembly that holds the buses in spaced relation with insulation therebetween.

The invention introduces the concept of tying both horizontal and vertical buses to a common insulating partition, and the partition spreads across such an area that it effectively provides a wall that subdivides the interior of a bay of a control center. The horizontal, main power distributing buses are mounted on one side of the partition, and the vertical feeder buses are mounted on the opposite side of the partition. By providing connections between the horizontal and vertical buses that pierce the insulating partition a unitary assembly is achieved which rigidly holds the horizontal and vertical buses in place. The partition thus serves the dual purpose of being a major structural component and of being an insulating medium providing an arc barrier between conductors.

It is a principal object of the invention to provide a molded insulating partition of large surface area that functions as a dividing wall, as described in the foregoing paragraph, which has channels formed in both its front and rear faces that snugly receive the power conducting bus bars. The bus bars are held firmly from physical movement, that might otherwise be caused by magnetic fields during transient conditions of large current surges. The channels have side walls to restrict motion of the buses that extend normal to the planes in which the buses reside, and thus they block movement in those particular directions in which the buses may be urged by magnetic forces.

A further object of the invention is to provide an insulating mounting for the power distributing buses of a control center in the form of a honeycombed partition, to thereby present longer surface paths between bus bars which increase surface resistance, to thereby increase surface breakdown voltages to minimize arcing under overload conditions. In this manner, high electrical ratings can be achieved for the apparatus.

Another object is to provide covered power distributing buses to which individual control assemblies are connected, to reduce hazards, and to enhance electrical isolation between the buses.

A still further object is to provide an improved power distributing construction for a control center made up of adjacent bays in which the laying and installation of wiring leading to individual electrical control assemblies is facilitated by wiring troughs which are well separated from the power distributing buses.

The power buses of the invention are preferably arranged with the horizontal buses having their medial height coinciding with the medial height of the control center, rather than being at the top of the control center, as in most prior constructions. By lowering the horizontal buses, the power input connections can be simplified by providing room in an end bay for the making of such connections with the vertical buses within that particular bay. Hence, it is one of the purposes of the invention to provide convenient power input connections in a location where the wiring extending from an external power source can be readily introduced to the control center.

The foregoing and other objects and advantages of the invention will appear from the following description. In the description reference is made to the accompanying drawings which form a part hereof, and in which there is shown by way of illustration and not of limitation a preferred embodiment of the invention. Such embodiment does not represent the full scope of the invention, but rather the invention may be employed in a variety of embodiments, and reference is made to the claims herein for interpreting the breadth of the invention.

DESCRIPTION OF THE PREFERRED EMBODIMENT

Figure 1:
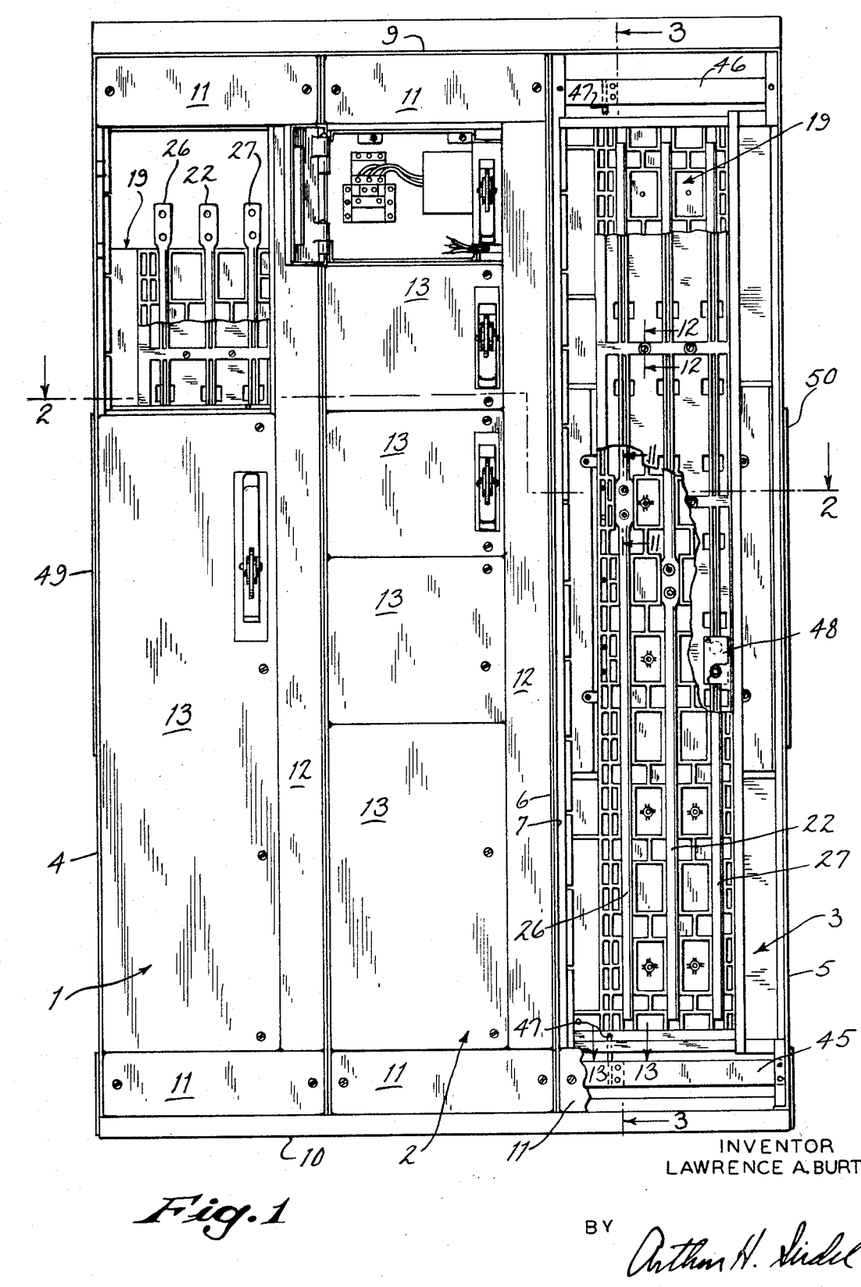
FIG. 1 is a front view of a control center consisting of three vertical bays, from which some of the parts have been removed and others have been broken away to reveal interior construction.
Figure 2:
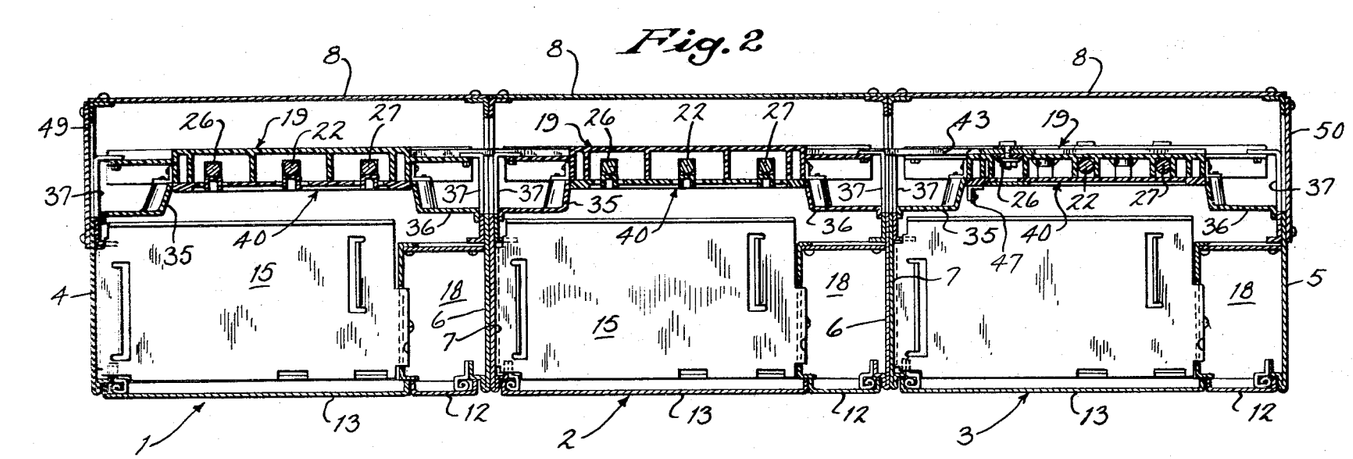
FIG. 2 is a plan view in section of the control center, on a scale enlarged from that of FIG. 1, which is taken through the plane 2—2 indicated in FIG. 1.

Referring now to the drawings, the description will commence with the general arrangement of the control center. FIGS. 1 and 2 show that the control center is comprised of three vertical bays 1, 2 and 3. The bays 1 and 3 have outer end walls 4 and 5 that are mirror images of one another, except for the locations of certain mounting holes and slots. Bay 1 has an inner end wall 6 that abuts against an inner end wall 7 of the bay 2, with the walls 6, 7 being mirror images of each other, except for the locations of certain mounting holes and slots. Similarly, an inner end wall 6 at the right hand side of the bay 2 abuts an inner wall 7 at the left hand side of the bay 3. Each bay 1, 2, 3 is provided with a rear wall 8 that completely encloses the back of the respective bay, and with a top cover 9, as particularly shown in FIG. 3. Running underneath the three bays 1, 2 and 3 is a pair of supports in the form of inverted channel members 10.

The front of each bay 1, 2, 3 is enclosed at the top and bottom by narrow cover plates 11, and the right hand margin of the front of each bay 1, 2 and 3 is enclosed by a hinged wiring trough door 12 that runs for the entire vertical height between associated upper and lower cover plates 11. The remainder of the front of the control center is enclosed by a plurality of cabinet doors 13 of various sizes, depending upon the nature and size of cabinets installed behind the doors. Each cabinet door 13 is hinged along its left hand margin and when the doors 13 of a bay 1, 2 or 3 are swung open the interior of the bay is exposed. Access is thus gained for the installation and removal of cabinets such as illustrated by the cabinet 14 shown in FIG. 9. The cabinets 14 house electrical control assemblies for operating motors and other electrical apparatus remote from the control assembly. The manner of installation of the cabinets 14 is described more fully in copending application, Ser. No. 104,376 filed Jan. 6, 1971 and entitled "Control Center Cabinet." Suffice for the present application, to point out that each cabinet 14 rests on a removal shelf 15, is secured in place by tightening mechanisms 16, and includes a stab-type connector 17 for making electrical connection with power input buses to be hereinafter described. The electrical control assemblies of the cabinets 14 have not been shown, except for the rendition at the top of bay 2, for purposes of clarity, and for the further reason such assemblies are not a part of the invention and take a variety of forms tailor-made for the equipment they control.

As particularly shown in FIG. 2, each wiring trough door 12 covers the front entrance to a vertical wiring trough 18. The vertical trough 18 serves as a conduit for wiring leading to and exiting from the cabinets 14 which is connected with the motors, or other apparatus, being controlled by the electrical equipment within the cabinets 14. This wiring is kept separate from the power input buses that are next to be described.

Figures 4, 5:
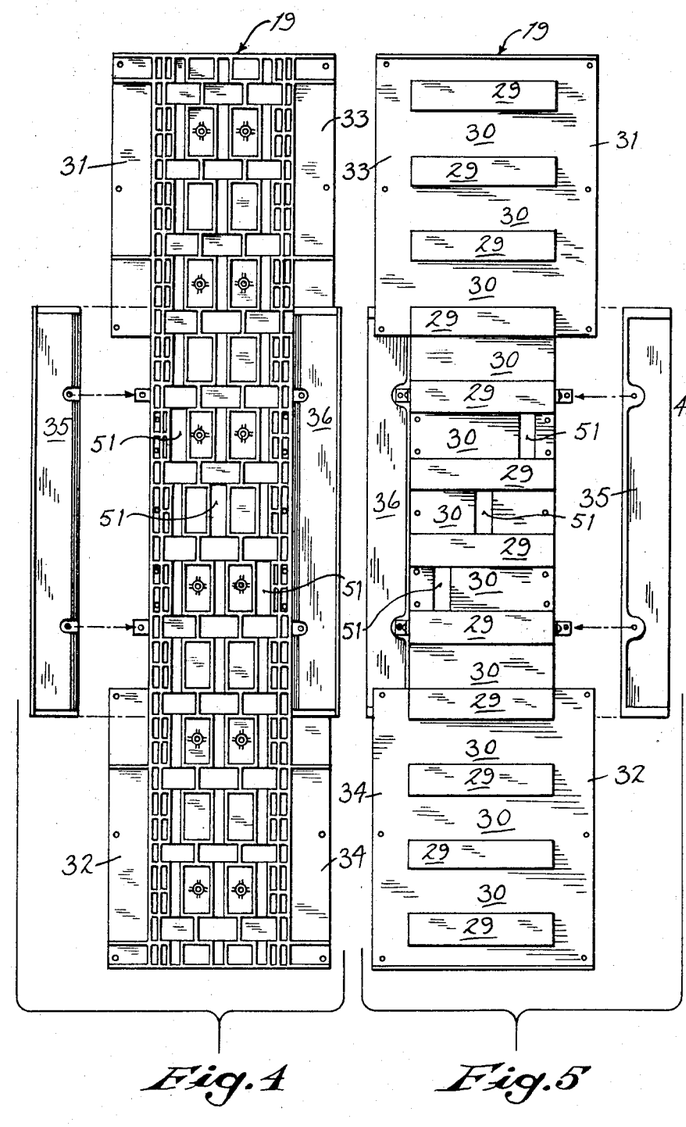
FIG. 4 is a front view of an insulating partition that forms a part of the invention.
FIG. 5 is a rear view of the insulating partition of FIG. 4.
Figure 7:
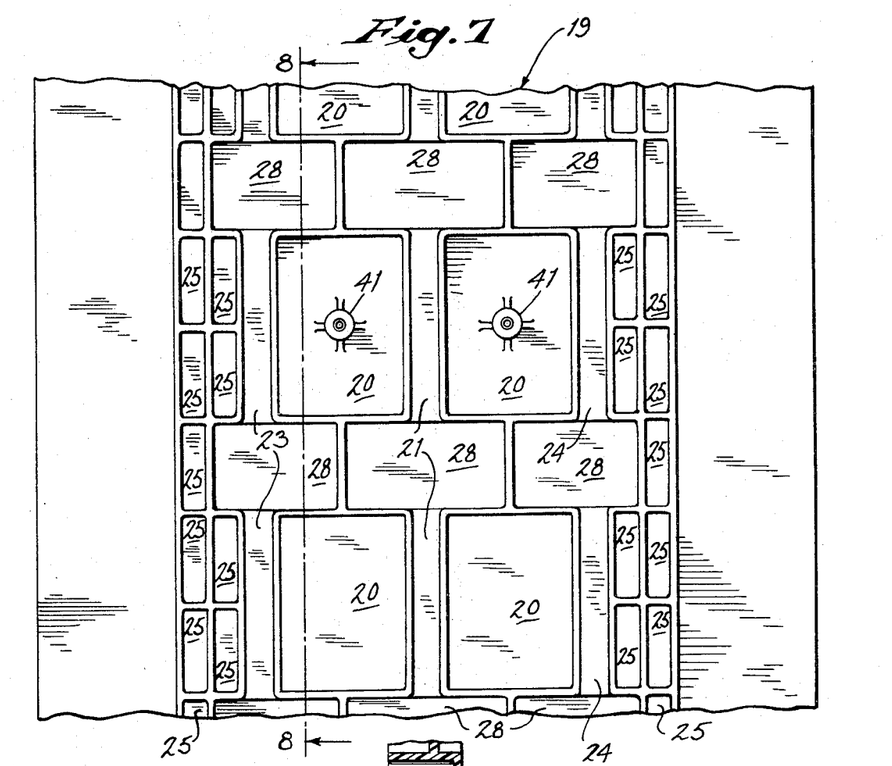
FIG. 7 is a fragmentary front view of the insulating partition of FIGS. 4 and 5 on an enlarged scale for the purpose of more clearly depicting the honeycomb structure of the partition.
Figure 8:
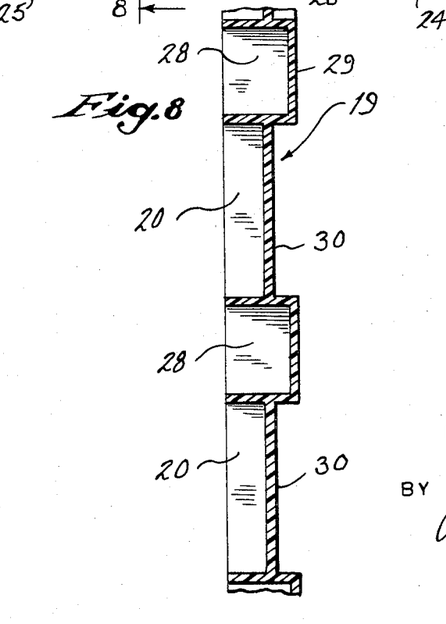
FIG. 8 is a view in cross section of the insulating partition taken through the plane 8—8 indicated in FIG. 7.

FIGS. 4 and 5 show a vertically rising, molded insulating partition 19 such as is mounted in each bay 1, 2 and 3 in a position approximately two-thirds to the rear of the respective bay. The front of each partition 19 is honeycombed to present a plurality of pockets of varying size and depth. The fragmentary views of FIGS. 7 and 8 show a portion of this honeycombed structure on an enlarged scale. The largest sized pockets 20 are rectangular with a height greater than their width. These pockets 20 are disposed in two vertical rows, or columns, and the pockets of a column are spaced vertically from one another to give a visual impression of a segmentation of each column. Each pocket 20 in a column is matched, or paired, at the same level with a pocket 20 in the other column, and the two columns are horizontally separated to define a narrow, vertical trough 21. The trough 21 is also segmented in appearance and it receives a stiff, conductive, vertical feeder bus 22, as shown in FIGS. 1 and 2.

As shown in FIG. 7, second and third vertical troughs 23 and 24, which are similar to the trough 21, are formed, respectively, to the left and the right of the large pockets 20. The trough 23 is defined by the left hand edge of the left hand column of pockets 20 and the right hand edge of a grouping of small margin pockets 25 which extend vertically for the height of the partition 19. In similar fashion, the right hand trough 24 is defined by the right hand edge of the right hand column of pockets 20 and an edge of a second grouping of small margin pockets 25. The troughs 23 and 24 receive left and right hand stiff, vertical feeder buses 26 and 27, as shown in FIGS. 1 and 2.

Referring to FIG. 8, the depth of the large pockets 20, as measured from the front of the partition 19, is approximately two-thirds the thickness of the partition. The small pockets 25 and the three segmented troughs 21, 23 and 24 are of the same depth as the large pockets 20. This common depth is shown in the right hand bay 3 of FIG. 2, and it is a depth that accommodates the full diameter of the vertical feeder buses 22, 26 and 27. The width of the narrow, vertical troughs 21, 23 and 24 provides a snug fit for the buses 22, 26 and 27 and the walls of the troughs 21, 23 and 24 are normal to the plane in which the buses 22, 26 and 27 lie, so that the buses 22, 26 and 27 are held from sidewise movement, that would otherwise occur in response to magnetic fields associated with the buses.

Referring back to FIGS. 7 and 8, the vertical separations between the large pockets 20 are seen to consist of rectangular pockets 28 which have a greater width than height. These pockets 28 are formed in groups of three lying in a horizontal row, and each row is interdigited between two successive pairs of large pockets 20. The forward, or front, edges of the pockets 28 are flush with the front edges of the pockets 20 and 25, but as particularly shown in FIG. 8, the pockets 28 are of a greater depth. The greater depth, as measured from the front, develops protrusions 29 at the rear of the insulating partition 19. A single protrusion 29 is formed by each horizontal set of three pockets 28, and this is clearly illustrated in FIG. 5. The result is the formation of a set of tiered, horizontally extending channels 30 of relatively short length across the back of the partition 19. The three channels 30 at mid-height of the partition 19 each have a rectangular opening 51, as shown in FIG. 5. The three openings 51 communicate with the three vertical troughs 21, 23 and 24, as illustrated in FIG. 4.

Figure 9:
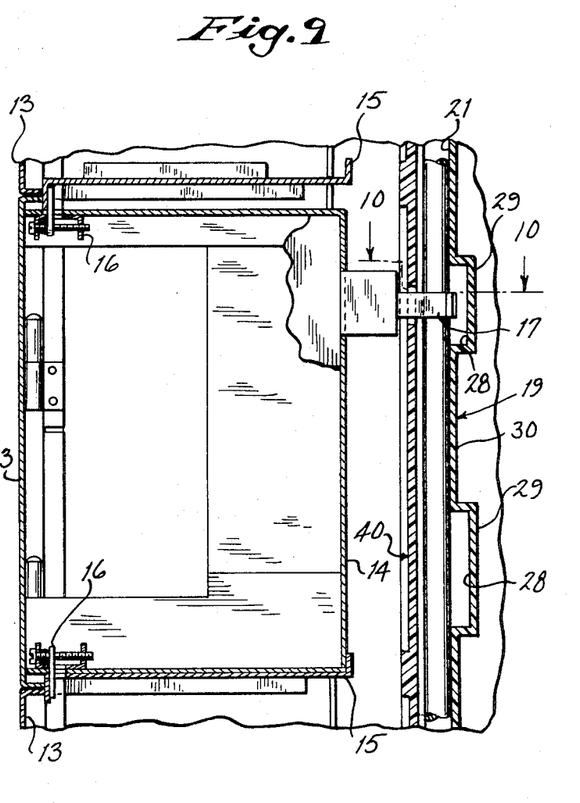
FIG. 9 is a fragmentary view in vertical section of a cabinet installed in a bay of the control center showing the manner of making electrical connection to vertical bus bars.
Figure 10:
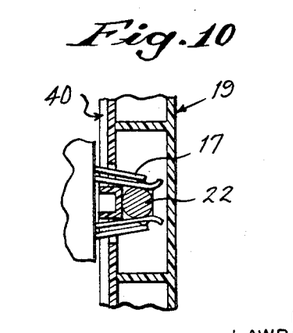
FIG. 10 is a fragmentary view in section of the electrical connection illustrated in FIG. 9 taken through the plane 10—10 indicated in FIG. 9.

The greater depth of the rectangular pockets 28 further serves to receive the stab-type connectors of the cabinets 14. This is illustrated in FIG. 9, wherein the vertical feeder bus 22 rests against the rear of the trough 21, and the connector 17 extends rearward of the bus 22 into the rear of a pocket 28. Thus, the spring fingers of the connector 17 have adequate room in which to function.

As seen in FIG. 4, each insulating partition 19 has an upper left hand side margin 31 and a lower left hand side margin 32 with a substantial vertical gap between the margins. Also, each insulating partition 19 has an upper right hand side margin 33 and a lower right hand side margin 34 with a similar vertical gap between these two margins. The gaps between margins 31, 32 and 33, 34 are bridged and enclosed by removable covers 35 and 36. As particularly shown in FIG. 2, the covers 35, 36 are of substantial depth, with an "L" shape in horizontal cross section, and they extend forwardly of the associated partition 19. The purpose of the covers 35, 36 is to provide access to horizontal bus bars within the control center, after the partitions 19 are installed in place.

Figure 3:
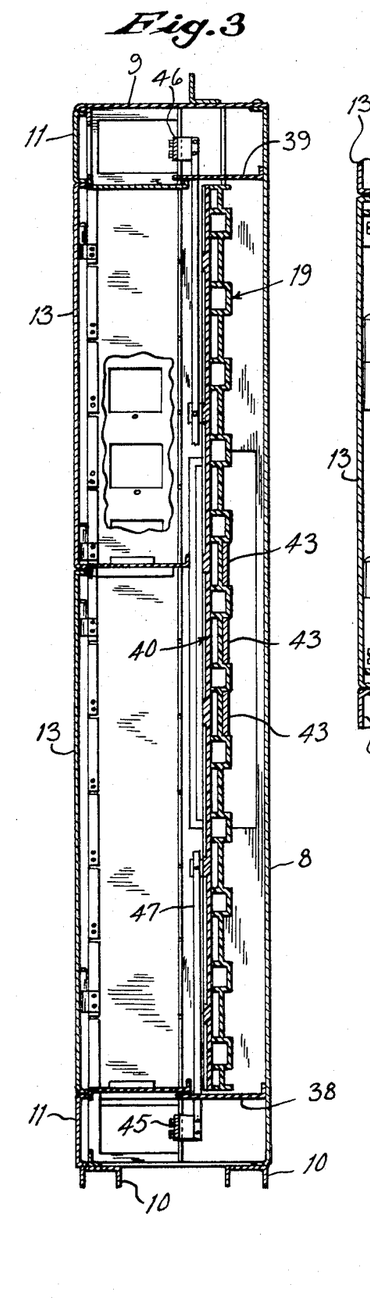
FIG. 3 is a view in vertical section of the control center taken through the plane 3—3 indicated in FIG. 1.

To mount the partitions 19 within the control center each bay 1, 2 and 3 is provided with brackets 37 fastened to the side walls 4, 5, 6 and 7, as shown in FIG. 2. The side margins 31-34 of each partitions 19 are bolted to the brackets 37, and as shown in FIG. 3, when a partition 19 is in place, it extends vertically between a floor 38 and a ceiling 39 that extend forwardly from the respective rear wall 8. Also, the partition 19 with its two covers 35, 36 extends sidewardly, across the full width of the interior of its bay 1, 2 or 3. Thus, a compartmentization is obtained within the bay, in which the rear face of the partition 19 is isolated from the front of the partition 19 and from the space in which the cabinets 14 are mounted.

Figure 6:
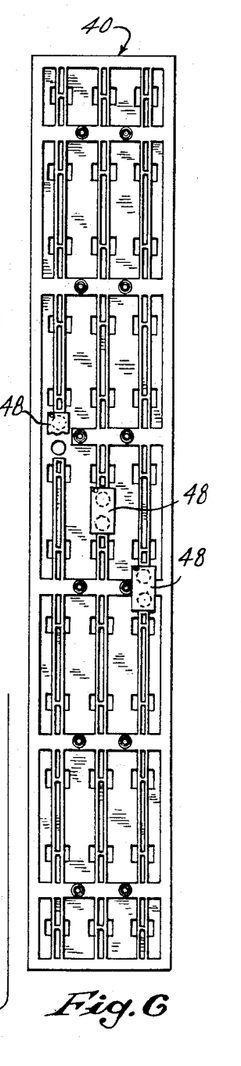
FIG. 6 is a front view of an insulating cover that fits over the front of the insulating partition of FIGS. 4 and 5.
Figure 12:
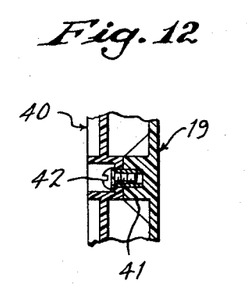
FIG. 12 is a fragmentary view in section of a mounting connection for the insulating cover of FIG. 6 as viewed through the plane 12—12 indicated in FIG. 1.

Each insulating partition 19 is fitted with a front cover 40, one of which covers 40 is shown in FIG. 6. As seen in FIGS. 1 and 2, each cover 40 fits over and encloses the pockets 20, 25 and 28, and the troughs 21 and vertical feeder buses 22, 26 and 27 lying within the troughs. In this manner, an insulating barrier is formed around each feeder bus 22, 26 and 27. To secure the covers 40 in place, a number of bosses 41 are formed in some of the pockets 20 (see FIG. 7) which receive mounting bolts 42 that pass through the covers 40. This construction is shown in FIG. 12. The covers 40 are also provided with appropriate openings through which the stab-type connectors 17 can protrude for making connection with the vertical buses 22, 26 and 27.

Referring now to bay 3 in FIG. 2, and to FIG. 3, a set of three stiff, horizontal power distributing buses 43 are fitted within the three center channels 30, and these buses 43 extend between all three bays 1, 2 and 3 of the control center. The buses 43 are of rectangular cross section to fit the channels 30, and are of narrow width compared to their height. This is illustrated in both FIGS. 3 and 11, and as a result of this configuration the power distributing buses 43 lie in a common, vertical plane. This plane defines the vertical direction magnetic forces tend to move the buses. The buses 43, however, are restrained by their snug fits with the side walls of the channels 30, which side walls extend normal to the direction of force.

Figure 11:
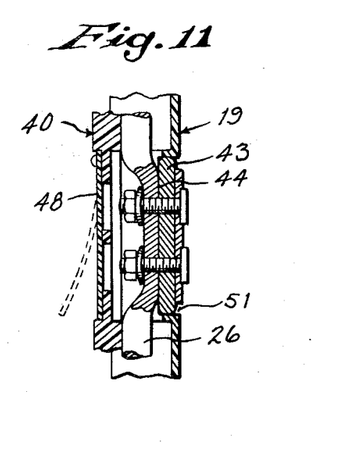
FIG. 11 is a fragmentary view in section of a connection between a horizontal main bus and a vertical feeder bus taken through the plane 11—11 indicated in FIG. 1.

The manner of connection of each horizontal bus 43 with a vertical bus 22, 26 or 27 on the opposite side of the partition 19 is illustrated in FIG. 11. At the point of connection, the respective vertical bus 26, which is the particular bus shown in FIG. 11, is flattened and offset to the rear, so that the resulting flat 44 abuts directly against the associated horizontal bus 43. This direct contact is made through one of the openings 51 in the partition 19. The bus 43 and bus 26 are then bolted to one another, and the result is a sandwich like construction in which the insulating partition 19 is held between vertical feeder buses and horizontal main buses. A sturdy construction results in which the insulating partition 19 retains the power conducting buses in position, and in turn the buses hold the partition firmly between them.

An example of the forces that are encountered, and which are to be withstood by the construction of the invention, is illustrated by the requirement of a 100,000 ampere short circuit test for 3 cycles at 60 cycles per second. The magnetic fields involved in such a test develop very substantial forces upon the main and feeder buses tending to separate and dislodge them from their usual positions. The insulating partition 19 provides adequate anchoring of the buses, and by reason of a honeycomb configuration, in which numerous pockets present cross walls normal to the general plane of the partition, the partition 19 can be molded as a large, unitary member of synthetic material. Adequate physical strength is derived from this construction in a large partition spanning the full interior of a control center bay, so as to present a wall-like member that compartmentalizes the interior of a control center bay. The honeycomb structure also provides troughs for buses which enhance isolation from one another and increase the insulating resistance between buses. By covering the feeder buses with the front covers 40 still greater cross insulation between buses is achieved.

Figure 13:
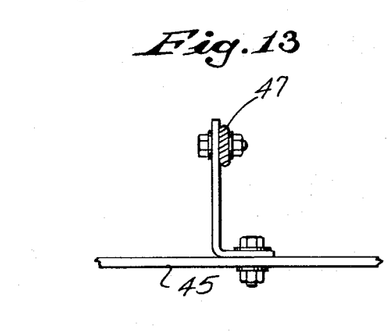
FIG. 13 is a fragmentary view of a ground conductor taken through the plane 13—13 indicated in FIG. 1.

The invention also provides for the inclusion of adequate ground conductors throughout the control center. In FIG. 1 there is shown a lower ground bus 45 located directly behind the bottom cover plates 11 that extends horizontally through the bottom regions of the bays 1, 2 and 3, and an upper ground bus 46 that is located behind the upper cover plates 11. As more particularly shown in FIGS. 3 and 13, a vertical ground conductor 47 connects to the ground bus 45 in bay 1 and rises upwardly in the bay to connect with the upper ground bus 46. There is a similar vertical ground conductor 47 in each bay, and these conductors 47 are located to the front of the insulating partitions 19. Stab-type connectors can be employed on the cabinets 14 for making connection with the ground conductors 47 before contact is made with the vertical buses 22, 26 and 27. In this manner a safety factor of grounding the cabinets 14 before connection is made with the power source is achieved. If desired, only one of the ground conductors 46, 47 need be employed, so long as adequate ground connection is made to the bay framework.

In bay 1 of FIG. 1 the three vertical feeder buses 22, 26 and 27 are shown as shortened at their upper ends, and flattened to make connection with power lines brought into the control center. Convenient space is thus provided for making these connections, and since the vertical buses 22, 26 and 27 in the bay 1 will be required to carry the entire load current of the control center, these particular buses 22, 26 and 27 should be of greater capacity than the vertical buses in the bays 2 and 3. This can be accomplished by making the buses 22, 26 and 27 of bay 1 from solid rod, while the buses 22, 26 and 27 of the bays 2 and 3 may be hollow. In the drawings, all vertical buses have been shown as solid rod as a matter of convenience.

Power input to the control center can also be accomplished by connection of the power lines entering the control center with the horizontal, main buses 43. For this purpose, a pair of removable cover plates 49 and 50 are mounted on the outer end walls 4 and 5, respectively, as shown in FIGS. 1 and 2. Thus, power lines can be introduced from either the left or right hand side of the control center. When the connection of power lines is made directly with the horizontal, main buses 43, the vertical feeder buses 22, 26 and 27 in bay 1 are not foreshortened as illustrated in FIG. 1, but can then be of the same length and capacity as the vertical buses in the other bays. Thus, the construction conveniently provides alternative modes of connecting with the incoming power lines.

When there are a large number of bays in a single control center, such as five or more, it becomes desirable to make the horizontal, main power distributing buses 43 in sections which are bolted, or spliced, together. This splicing facilitates installation and erection of a control center, or the addition of further bays to an existing control center. To give access to the connections joining segments of buses 43 the removable covers 35 and 36 have been provided as a part of the insulating partitions 19. Upon their removal the buses 43 are exposed to the front, so that they may be worked upon. Another access to the bus bar connections is illustrated in FIG. 11. A small, pivoted flap 48 of stiff, but flexible insulating sheet material is attached to the front cover 40. One such flap 48 is directly in front of each bolted connection between a vertical, feeder bus 22, 26, 27 and a horizontal main bus 43 (see FIG. 6). Thus, the buses can be connected and disconnected without need of any dismantling of the insulating partitions 19 and their covers 40.

The invention provides a power distributing system for a control center having insulating partitions that shroud the rear of each bay from the front, to thereby obtain a compartmentalization. The partitions also fully support all power distributing buses, and by securing horizontal and vertical buses to one another, and by locating them on opposite sides of the partitions a novel, mutual mounting is achieved from the electrical connections between the horizontal and vertical buses. A further aspect of this construction is the vertical location of the horizontal buses being within the vertical extent of the vertical buses.

The insulating partitions 19 can each be advantageously molded of one piece. The full length partitions are symmetrical about both horizontal and vertical center lines, which feature facilitates assembly. The unusual honeycomb structure provides both rigidity and tortuous paths between buses which enhance insulating qualities of the structure. While the embodiment shown has the honeycomb pockets open at the front, the openings could be reversed, to face the rear, for pockets that do not receive the vertical buses 22, 26 and 27.

The horizontally extending channels 30 on the back of the partitions 19 provide means for mounting additional horizontal buses 43, such as a neutral or control bus. The height of the removable covers 35, 36 is sufficient to accommodate such extra buses. The ability to turn a partition 19 end for end is particularly significant for the shorter partitions, such as shown in FIG. 1. By reversing such partition the short, flattened ends of the vertical buses 22, 26, 27 are disposed at the bottom of the bay 1, and then input power connections can be made from the floor. Thus, simple reversibility of parts provides for attachment of incoming power lines in either of two locations.

I claim:

1. In an insulating partition for an electrical control center, the combination comprising:

a molded member of insulating material forming the partition proper, which member is formed in a configuration that presents a honeycomb of pockets, such pockets comprising:

a first set of pockets of uniform size that rise in two spaced columns with the pockets of a column spaced vertically from one another, and with each pocket being paired at a substantially common level with a pocket in the other column, such columns of pockets defining a vertical trough between columns to receive an electrically conductive vertical feeder bus;

a set of margin pockets extending vertically of the partition and paralleling said first set of pockets at the outer sides thereof, said margin pockets being horizontally spaced from the columns comprised of said first set of pockets to define vertical troughs for receiving additional vertical feeder buses; and a third set of pockets which are sub-divided into groups that extend horizontally in the vertical spacing between pockets of said first set, which third set of pockets are deeper than said first set of pockets to protrude at the rear of the molded members;

said molded member having a rear face with horizontal channels formed therein by the protruding of said third set of pockets, such channels adapted to receive horizontally disposed electrically conductive bus bars;

apertures in said molded member, each aperture leading from one of said vertical troughs to one of said horizontal channels;

mounting margins ranging along each side of the molded wall member outboard of said margin pockets, the margins on each side being subdivided by a gap;

removable cover plates enclosing each of said gaps; and a cover secured to and overlying the honeycomb configuration of said molded member which has regularly spaced apertures to the front of said vertical troughs to provide access for electrical connection with buses within said vertical troughs.

2. In an insulating partition for an electrical control center, the combination comprising:

a molded member of insulating material forming the partition proper, which member is formed in a configuration that presents a honeycomb of pockets, such pockets comprising:

a first set of pockets of uniform size that rise in two spaced columns with the pockets of a column successively spaced vertically from one another, and with each pocket being paired at a substantially common level with a pocket in the other column, such columns of pockets defining a vertical trough between columns;

a set of margin pockets that rise along the outboard sides of said columns and which are horizontally spaced from the columns to define further vertical troughs; and a third set of pockets which are in groups that extend horizontally in the vertical spacing between pockets of the first set, which third set of pockets are deeper than the first set;

said molded member having a rear face with protrusions formed therein by the greater depth of said third set of pockets, such protrusions defining horizontal channels in a common vertical plane;

apertures in said molded member, each aperture leading from one of said vertical troughs to one of said horizontal channels; and a cover secured to and overlying the honeycomb configuration of said molded member.

3. In an electrical control center, the combination comprising:

a number of vertical bays;

a wall-like member of insulating material in each bay to form a partition extending horizontally and vertically of the bay to subdivide the bay into front and rear regions, which wall-like member is formed with a plurality of pockets subdividing the member both horizontally and vertically that are arranged in a configuration that presents a set of vertical troughs on the front face and a set of horizontal channels on the rear face which cross over the vertical troughs;

each of said wall-like members having a set of apertures, each aperture leading from one of said vertical troughs to one of said horizontal channels;

a group of main power distributing buses fitted in said horizontal channels on the rear face of said wall-like members and extending from the member in one bay to the member in the next bay;

a group of power distributing feeder buses fitted in said set of vertical troughs on the front face of each of said wall-like members; and connections for each member joining each main bus with a feeder bus through one of said apertures, such connections for each member tightly holding the buses to one another and against said wall-like member on opposite sides thereof.

4. A control center as in claim 3, wherein said horizontal channels of each wall-like member are disposed vertically at a level between the vertical extremities of said vertical troughs.

5. A control center as in claim 3, wherein the pockets of each wall-like member extend in varying depths transverse to the plane of the member.

6. A control center as in claim 5, wherein each wall-like member is molded as a unitary piece.

7. A control center as in claim 3, wherein each wall-like member is symmetrical about a vertical center line, whereby it may be installed with either end uppermost.

8. A control center as in claim 3 with said main power distributing buses lying in a common plane paralleling said wall-like members and with said channels having side walls normal to such plane; and with said feeder buses of each wall-like member lying in a common plane paralleling said wall-like member and with said troughs of the member having side walls normal to such plane.

9. A control center as in claim 8 with a cover for each wall-like member overlying said troughs of the member and the feeder buses of the member disposed therein, said covers having apertures to permit electrical connection with said feeder buses.

10. A control center as in claim 3 with side margins for each wall-like member that are disposed along the vertical extremities of the member, said side margins having mounting means and being interrupted along their lengths to present openings exposing said main bus bars from the front of the member and removable covers over said openings.

11. In an electrical control center having a plurality of vertical bays for receiving individual control assemblies, the combination therewith of:
an insulating partition secured within each bay that extends vertically and sidewardly to define compartments at both the front and rear of the partition, each partition having:
a first set of pockets of uniform size that rise in two spaced columns with the pockets of a column successively spaced vertically from one another, and with each pocket being paired at a substantially common level with a pocket in the other column, such columns of pockets of defining a vertical trough between columns;
a set of margin pockets that rise along the outboard sides of said columns and which are horizontally spaced from the columns to define further vertical troughs; and
a third set of pockets which are in groups that extend horizontally in the vertical spacing between pockets of the first set, which third set of pockets are deeper than the first set;
a rear face with ridges therein formed by the greater depth of said third set of pockets, such ridges defining horizontal channels therebetween;
a set of stiff, power distributing, main buses within said horizontal channels that extend from bay to bay;
a set of stiff, power distributing, feeder buses snugly fitted within said vertical troughs; and
connections joining each feeder bus with a main bus through said insulating partition, and holding the feeder buses, main buses and insulating partition of a bay in tight assembly with the partition sandwiched between the feeder and main buses.

12. In an electrical control center as in claim 11, wherein said main buses are all at a level within the vertical extent of the feeder buses.

13. In an electrical control center having a plurality of vertical bays for receiving individual control assemblies, the combination therewith of:
an insulating partition secured within each bay that extends vertically and sidewardly to define compartments at both the front and rear of the partition, each partition having:
a set of horizontal channels in its rear face, which channels lie in a common, sidewardly extending, vertical plane and which have a median line at a level approximately mid-way of the height of the partition,
a set of vertical troughs in its front face which lie in a common, sidewardly extending, vertical plane, and
a set of apertures, each of which leads from one of said horizontal channels in the rear face to one of said vertical troughs in the front face;
a set of stiff, power distributing, main buses snugly fitted within said horizontal channels that extend from bay to bay and lie over said apertures;
a set of stiff, power distributing, feeder buses snugly fitted within said vertical troughs of each partition that lie over said apertures; and
connections joining each feeder bus with a main bus through one of said apertures, and holding the feeder buses, main buses and insulating partition of a bay in tight assembly with the partition sandwiched between the feeder and main buses.

14. A control center as in claim 13 with a cover for each insulating partition enclosing said vertical troughs and the feeder buses disposed therein, said cover having apertures to the front of the feeder buses which are successively spaced along the length of such buses; and control assembly cabinets housed within each bay at the front of the partition of the bay which have connectors extending through said apertures into electrical connection with said feeder buses.

15. A control center as in claim 13 having a floor and ceiling in each bay completing, with the partition of the bay, a compartmentalization within the bay.

* * * * *